United States Patent
Heidari et al.

(10) Patent No.: US 8,942,967 B2
(45) Date of Patent: Jan. 27, 2015

(54) METHOD FOR REAL-TIME RESERVOIR MODEL UPDATING FROM DYNAMIC DATA WHILE KEEPING THE COHERENCE THEREOF WITH STATIC OBSERVATIONS

(75) Inventors: Leila Heidari, Pau (FR); Veronique Gervais-Couplet, Rueil-Malmaison (FR); Mickaele Le Ravalec, Rueil-Malmaison (FR); Hans Wackernagel, Fontainebleau (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 239 days.

(21) Appl. No.: 13/349,775

(22) Filed: Jan. 13, 2012

(65) Prior Publication Data

US 2012/0191433 A1    Jul. 26, 2012

(30) Foreign Application Priority Data

Jan. 20, 2011   (FR) .................................. 11 00170

(51) Int. Cl.
   *G06G 7/48* (2006.01)
   *G01V 99/00* (2009.01)
(52) U.S. Cl.
   CPC ..................................... *G01V 99/00* (2013.01)
   USPC .......................................................... 703/10
(58) Field of Classification Search
   USPC .......................................................... 703/10
   See application file for complete search history.

(56) References Cited

U.S. PATENT DOCUMENTS

2007/0118346 A1   5/2007   Wen et al.

FOREIGN PATENT DOCUMENTS

WO   WO 2010/088516 A2   8/2010

OTHER PUBLICATIONS

Wen et al. Real-Time Reservoir Model Updating Using Ensemble Kalman Filter; SPE 92991; 2005; pp. 1-14.*
Ravalec-Dupin et al.; Conditioning Truncated Gaussian Realizations to Static and Dynamic Data; Dec. 2004 SPE Journal; pp. 475-480.*
Jeong et al.; Reliable reservoir model updating using GDM with EnKF; GEP-16 Improved understanding of the clastic reservoirs through the use of new technologies; 2008; one page.*
Jeong et al.; Reservoir Characterization from Insufficient Static Data Using Gradual Deformation Method with Ensemble Kalman Filter; Energy Sources, Part A: Recovery, Utilization, and Environmental Effects; vol. 32, Issue 10, 2010; one page.*
Thomas et al. History Matching Reservoir Models Simulated from the Pluri-Gaussian Method; SPE 94168; 2005; pp. 1-10.*

(Continued)

*Primary Examiner* — Hugh Jones
(74) *Attorney, Agent, or Firm* — Antonelli, Terry, Stout & Kraus, LLP.

(57) ABSTRACT

The invention is a method for real-time updating of a geological model using dynamic data while maintaining the coherence thereof with static observations. An initial set of reservoir property maps, obtained from stochastic simulations of a random function, are available. Parameters providing new realizations of the random function when applied to the set are selected. New maps are created using initial values of the parameters. As soon as new dynamic data are available, the parameters are modified to reduce a difference between the simulated data for perturbed models and the measured data. Finally, the reservoir is developed using a modified development scheme to account for the deformed maps.

6 Claims, 5 Drawing Sheets

(56) References Cited

OTHER PUBLICATIONS

Mickaele Le Ravalec, et al: 2000, The FFT Moving Average (FFT-MA) Generator: An Efficient Numerical Method for Generating and Conditioning Gaussian Simulations, Mathematical Geology, 32(6), pp. 701-723.

RamaRao, Band S. et al: 1995, "Pilot Point Methodology for Automated Calibration of an Ensemble of Conditionally Simulated Transmissivity Fields. 1. Theory and Computational Experiments", Water Resources Research, vol. 31, No. 3, pp. 475-493, Mar. 1995.

Gómez-Hernánez, J. Jaime, et al: 1997, Stochastic Simulation of Transmissivity Fields Conditional to Both Transmissivity and Piezometric Data, 1. Theory, Journal of Hydrology, 203, pp. 162-174.

Hu, Lin Y.: 2000, Gradual Deformation and Iterative Calibration of Gaussian-Related Stochastic Models, Mathematical Geology, vol. 32, No. 1, 2000, pp. 87-108.

Caers, Jeff: 2003, Geostatistical "History Matching Under Training-Image Based Geological Constraints", SPE J. 8(3), pp. 218-226.

Kalman, R. E.: 1960, "A New Approach to Linear Filtering and Prediction Problems," Transactions of ASME, Journal of Basic Engineering, 82, pp. 35-45.

Seiler, A., et al: "Structural Uncertainty Modelling and Updating by Production Data Integration", Society of Petroleum Engineers—SPE/EAGE Reservoir Characterization and Simulation Conference 2009—Overcoming Modeling Challenges to Optimize Recover—Society of Petroleum Engineers—SPE/EAGE Reservoir Characterization and Simulation Conference, vol. 1, 2009, pp. 1-19, XP002665286.

Zhang, Yanfen, et al: "History Matching Using a Hierarchical Stochastic Model with the Ensemble Kalman Filter: A Field Case Study", SPE Reservoir Simulation Symposium Proceedings—SPE Reservoir Simulation Symposium 2009, 2009 Society of Petroleum Engineers USA< vol. 1, 2009, pp. 1-15, XP002665287.

Coutinho, Emilio J.R., et al: "Conditioning Multilayered Geologica Models to Well-Test and Production-Logging Data Using the Ensemble Kalman Filter", Proceedings—SPE Annual Technical Conference and Exhibition—Society of Petroleum Engineers—SPE Annual Techical Conference and Exhibition 2010, ATCE 2010, 2010 Society of Petroleum Engineers (SPE) USA, vol. 4, 2010, pp. 1-19, XP002665288.

\* cited by examiner

METHOD FOR REAL-TIME RESERVOIR MODEL UPDATING FROM DYNAMIC DATA WHILE KEEPING THE COHERENCE THEREOF WITH STATIC OBSERVATIONS

BACKGROUND OF THE INVENTION

1. Field of the Invention

The present invention relates to the petroleum industry, and more particularly to development of underground reservoirs such as petroleum reservoirs or gas storage sites.

2. Description of the Prior Art

Optimization and development of a petroleum reservoir are based on the most accurate possible description of the structure, the petrophysical properties, the fluid properties, etc., of the reservoir. Specialists use a known computer tool allowing accounting for the above aspects in an approximate way which is the reservoir model. Such a model is a model of the subsoil, representative of both its structure and its behavior. Generally, this type of model is represented in a computer, it is then referred to as a numerical model. A reservoir model comprises a grid, generally three-dimensional, associated with one or more petrophysical property maps (porosity, permeability, saturation, etc.). The association assigns values of the petrophysical properties to each cell of the grid.

These well-known models, which are widely used in the petroleum industry, allow determination of many technical parameters relative to the study or the development of a reservoir such as for example, a hydrocarbon reservoir. In fact, since the reservoir model is representative of the structure of the reservoir and of the behavior thereof, engineers use it for example to determine which zones are the most likely to contain hydrocarbons, the zones in which it may be interesting/necessary to drill an injection or a production well in order to enhance hydrocarbon recovery, the type of tools to use, the properties of the fluids to be used and recovered, etc. These interpretations of reservoir models in terms of "technical development parameters" are well known. Similarly, modelling $CO_2$ storage sites allows to monitor these sites, to detect abnormal behaviors and to predict the displacement of the injected $CO_2$.

The purpose of a reservoir model thus is to best account for all the available information on a reservoir. A reservoir model is representative when a reservoir simulation for the model provides numerical responses that are very close to the observed historical data. What is referred to as historical data are the production data obtained from measurements in wells in response to the reservoir production (oil production, water production of one or more wells, gas/oil ratio (GOR), production water proportion (water cut)), and/or repetitive seismic data (4D seismic impedances in one or more regions, etc.). A reservoir simulation is a technique allowing simulation of fluid flows within a reservoir by software referred to as flow simulator.

Integration of all the available data is therefore essential. These data generally comprise:

Measurements, are made at certain points of the geological formation, of the modelled property, in wells for example. These data are referred to as static because they are invariable in time (on the scale of the reservoir production times) and they are directly linked with the property of interest, "Historical data", are production data, as for example, the fluid flow rates measured in wells, tracer concentrations and data obtained from repetitive seismic acquisition campaigns at successive times. These data are referred to as dynamic because they evolve during development and they are indirectly linked with the properties assigned to the cells of the reservoir model.

The available static data are used to define random functions for each petrophysical property, such as porosity or permeability. A representation of the spatial distribution of a petrophysical property is a realization of a random function. In general, a realization is generated, on the one hand, from a mean, a variance and a covariance function that characterizes the spatial variability of the property being studied and, on the other hand, from a single or a series of random numbers. There are many simulation techniques such as the sequential Gaussian simulation, Cholesky's method or the FFT-MA method.

Goovaerts, P., 1997, Geostatistics for Natural Resources Evaluation, Oxford Press, New York, 483 p.

Le Ravalec, M., Noetinger B., and Hu L.-Y., 2000, The FFT Moving Average (FFT-MA) Generator: An Efficient Numerical Method for Generating and Conditioning Gaussian Simulations, Mathematical Geology, 32(6), 701-723.

Techniques for integration of dynamic data (production and/or 4D seismic) in a reservoir model are known which are referred to as "history matching" techniques.

History matching modifies the parameters of a reservoir model, such as permeabilities, porosities or well skins (representing damages around the well), fault connections, etc., in order to minimize the differences between the measured historical data and the corresponding responses simulated from the model. The parameters can be linked with geographic regions, such as permeabilities or porosities around one or more wells. The difference between real data and simulated responses forms a functional referred to as the "objective function". The history matching problem is solved by minimizing this functional.

There are several types of methods for minimizing this functional. Some require considering in the objective function all the dynamic data available over time. The integration of new data requires reconsidering all the production record during the reservoir simulations, which may involve long computing times. Furthermore, these data are sometimes acquired in real time. History matching methods have thus been developed, which allow integration of new dynamic data in the reservoir models as soon as they are acquired, while simulating only the period of time since the last acquisition. These methods are referred to as sequential. An example thereof is the Ensemble Kalman Filter (EnKF) method, which is widely used in reservoir engineering:

Evensen, G., 2007, Data assimilation: The Ensemble Kalman Filter, Berlin, Germany, Springer.

This method applies to a set of reservoir models and it provides a set of models calibrated to the dynamic data.

When it is desired to assimilate new dynamic data with the Ensemble Kalman Filter (EnKF) method, a given time in the reservoir development is considered and it is assumed that a set of models of the reservoir is known at this time. This time can correspond to the state of the reservoir before production or it can result from a previous assimilation. A reservoir simulation is then performed on each model of the time considered up to the time of acquisition of the new data. A filter is then applied in order to adjust the reservoir models and to compel them to meet the measured data.

However, this filter is applied to all of the reservoir models and it does not guarantee that the perturbed models verify the spatial variability model deduced from the static observations.

SUMMARY OF THE INVENTION

The invention allows modifying representations of the reservoir, referred to as reservoir models, in order to make the models coherent with the various data collected in the field.

The invention relates to a technique allowing sequential updating of the reservoir models as soon as new dynamic data are available while preserving the spatial variability model deduced from the static observations. This method is based on the application of the Ensemble Kalman Filter (EnKF) method to parameters allowing perturbing reservoir models without modifying the coherence thereof with static data.

In general terms, the invention relates to a computer implemented method of developing a petroleum reservoir according to a development scheme defined from a representation of the reservoir, the representation comprising a grid associated with maps of properties of the reservoir, each map being a realization of the same random function obtained by a stochastic simulation, wherein dynamic data are acquired during the development of the reservoir, and the maps are modified to minimize a difference between the dynamic data and dynamic data simulated by the reservoir representation and a flow simulator. The method comprises the following stages:
selecting a perturbation method with P perturbation parameters which allows perturbing the maps while ensuring that each perturbed map remains a realization of the random function;
modifying the parameters by applying an Ensemble Kalman Filter (EnKF) method to the perturbation parameters and to the simulated dynamic data;
modifying the maps by applying the perturbation method with the modified parameters'
adjusting the reservoir development scheme by accounting for the modified maps; and
developing the reservoir using the modified development scheme.

According to the invention, the perturbation method can be selected from among one of the following methods:
the gradual deformation method,
the pilot point method,
the probability perturbation method, and
the cosimulation perturbation method.

According to an embodiment, the perturbation method is the gradual deformation method and Gaussian white noises, from which the maps of properties of the reservoir are generated, are perturbed.

According to another embodiment, the perturbation method is the gradual deformation method, realizations of a reduced centered Gaussian random function are perturbed, and truncated Gaussian and pluriGaussian methods are used to deduce facies realizations.

According to these two embodiments, the perturbation method can be the local gradual deformation method.

BRIEF DESCRIPTION OF THE DRAWINGS

Other features and advantages of the method according to the invention will be clear from reading the description hereafter of embodiments given by way of non limitative examples, with reference to the accompanying figures wherein.

DETAILED DESCRIPTION OF THE INVENTION

Figure 1:
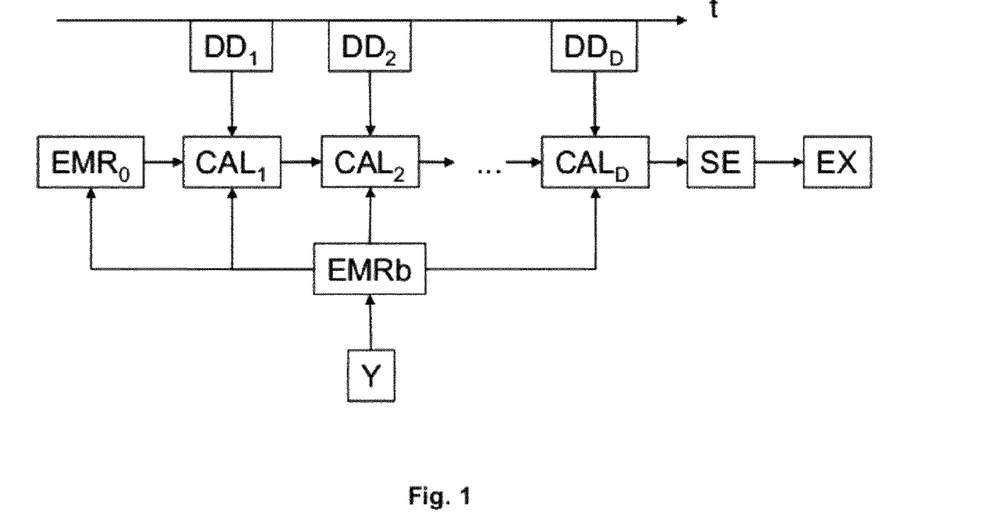
FIG. 1 illustrates the method of developing a petroleum reservoir according to the invention.

FIG. 1 illustrates the computer implemented method according to the invention for developing a petroleum reservoir according to a predetermined development scheme. An initial set of maps of a reservoir property obtained by stochastic simulations of a random function is available. Parameters providing new realizations of the random function, applied to the set, are selected. New maps are created using initial values of these parameters. As soon as new dynamic data are available, the parameters are modified to reduce a difference between the simulated data for the perturbed models and the measured data. Finally, the reservoir is developed using a modified development scheme to account for the deformed maps.

According to an embodiment example, the method comprises five stages:
1. generating a set of N computer implemented reservoir models;
2. acquiring dynamic data ($DD_1, \ldots DD_D$) during the reservoir development;
3. performing history matching upon each acquisition ($CAL_1, \ldots CAL_D$) by the following stages (FIG. 2):
   selecting a perturbation method with P perturbation parameters;
   modifying the parameters by applying an Ensemble Kalman Filter (EnKF) method; and
   modifying the reservoir models by applying the perturbation method with the modified parameters;
4. adjusting the reservoir development scheme by accounting for the modified reservoir models; and
5. developing the reservoir using the modified development scheme.

1—Generating a Set of Reservoir Models

This stage comprises the following:
a. Generating a set of M stochastic models referred to as "base set" ($EMR_b$) from a random function (Y);
b. Selecting perturbation parameters and applying them to the base set to generate a set of initial reservoir models ($EMR_0$):
   i. selecting P parameters allowing perturbing a realization of Y while ensuring that the realization obtained after perturbation remains a realization of Y wherein N sets of initial values of the P parameters ($PAR_0$) are generated; and ii. applying the initial values to the base set according to the selected parametrization technique wherein a set of N reservoir models at the initial time (EMR$_0$) is obtained.

a. Generating the Base Set (EMRb)

Geological formations are generally very heterogeneous media. Modelling a reservoir, that is constructing a reservoir model representative of the reservoir, requires construction methods referred to as "probabilistic" due to the limited information available (limited number of wells, etc.). Probabilistic methods are therefore used to construct geological models. These models are referred to as "stochastic models". Construction of a stochastic reservoir model must first depend on the environment of the geological deposit which allows representing the major heterogeneities controlling the fluid flow. Integration of the static data in this model involves linear operations and it can be done from known geostatistical techniques.

A reservoir model represented in a computer has a grid with N dimensions (N>0 and generally two or three) with each cell thereof being assigned the value of a property characteristic of the zone being studied. It can be, for example, the porosity or the permeability distributed in a reservoir. These values make up maps. Thus, a model is a grid associated with at least one map.

The value of a property characteristic of the zone being studied is referred to as regionalized variable. It is a continuous variable, spatially distributed, and representative of a physical phenomenon. From a mathematical point of view, it is simply a function z(u) taking a value at each point u (the cell of the grid) of a field of study D (the grid representative of the reservoir). However, the variation of the regionalized variable in this space is too irregular to be formalized by a mathematical equation. In fact, the regionalized variable represented by z(u) has both a global aspect relative to the spatial structure of the phenomenon studied and a random local aspect.

This random local aspect can be modelled by a random variable (VA). A random variable is a variable that can take a certain number of realizations z according to a certain probability law. Continuous variables such as seismic attributes (acoustic impedance) or petrophysical properties (saturation, porosity, permeability) can be modelled by random variables VA. Therefore, at point u, the regionalized variable z(u) can be considered to be the realization of a random variable Z.

However, in order to properly represent the spatial variability of the regionalized variable, it must be possible to account for the double aspect of both random and structured. One possible approach, of probabilistic type, involves the notion of random function. A random function (FA) is a set of random variables (VA) defined in a field of study D (the grid representative of the reservoir), that is $\{Z(u), u \in D\}$, also denoted by Z(u). Thus, any group of sampled values $\{z(u_1), \ldots, z(u_n)\}$ can be considered to be a particular realization of random function $Z(u)=\{Z(u_1), \ldots, Z(u_n)\}$. Random function Z(u) allows accounting for both the locally random aspect (at u*, the regionalized variable z(u*) being a random variable) and the structured aspect (via the spatial probability law associated with random function Z(u)).

The realizations of a random function provide stochastic reservoir models. From such models, it is possible to appreciate the way the underground zone studied works. For example, simulation of the flows in a porous medium represented by numerical stochastic models allows, among other things, predicting the reservoir production and thus optimizing its development by testing various production scenarios.

The reservoir model is a computer based representation of the reservoir. It comprises a grid associated with at least one map of a characteristic property of the reservoir. This map is obtained by a stochastic simulation of a first random function. This stage can be described as follows:

First, static data are measured in the field by measurements on samples taken in wells, seismic surveys, then, from the static data, a random function characterized by its covariance function (or similarly by its variogram), its variance and its mean is defined;

a set of random numbers which are independent of one another is defined which can be, for example, a Gaussian white noise or uniform numbers. Thus, an independent random number per cell and per realization are obtained;

from a selected geostatistical simulator and from the set of random numbers, a random draw in the random function is performed, giving access to a (continuous or discrete) realization representing a possible image of the reservoir. Conventionally, the random draw is performed in a hierarchical context. First, the reservoir model is randomly populated by a realization of the random function associated with the facies, conditionally to the facies measurements punctually obtained. Then, the porosity is generated randomly on each facies which is conditional to the porosity data obtained for the considered facies. The horizontal permeability is then simulated according to its associated random function, conditional to the facies and to the porosities drawn before, and to the permeability measurements taken in the field. Finally, the reservoir model is populated by a random realization of the vertical permeability, conditional to all the previous simulations and to the permeability data punctually obtained, considering several sets of random numbers, a set of realizations representing several possible images of the reservoir are obtained.

b. Generating the Set of Reservoir Models at the Initial Time (EMR0)

Various perturbation techniques modify the realization of a random function while ensuring that the perturbed realization is also a realization of this random function. Examples of these techniques are the pilot point method developed by RamaRao et al. (1995) and Gomez-Hernandez et al. (1997), the gradual deformation method provided by Hu (2000) and the probability perturbation method introduced by Caers (2003):

RamaRao, B. S, Lavenue, A. M., Marsilly, G. de, Marietta, M. G., 1995, Pilot Point Methodology for Automated Calibration of an Ensemble of Conditionally Simulated Transmissivity Fields. 1. Theory and Computational Experiments. WRR, 31 (3), 475-493, Gomez-Hernandez, J., Sahuquillo, A., et Capilla, J. E., 1997, Stochastic Simulation of Transmissivity Fields Conditional to Both Transmissivity and Piezometric Data, 1. Theory, J. of Hydrology, 203, 162-174, Hu, L-Y., 2000, Gradual Deformation and Iterative Calibration of Gaussian-Related Stochastic Models, Math. Geol., 32(1), 87-108, Caers, J., 2003, Geostatistical History Matching Under Training-Image Based Geological Constraints. SPE J. 8(3), 218-226.

The probability perturbation method or the cosimulation perturbation method can also be mentioned.

It is assumed here that a set of M models $\tilde{Y}_j$, j=1 ... M, referred to as "base set", has been created from a random function Y. Then:

a perturbation technique is selected;

P perturbation parameters associated with the selected technique are chosen and N sets of values are generated for these parameters $\theta_k^0 = (\theta_{k,1}^0, \ldots, \theta_{k,P}^0)$, k=1 ... N (PAR$_0$); and the parametrization technique is applied to the base set, using successively the N sets of parameters with a set of N initial reservoir models $Y_k^0$, k=1 ... N (EMR$_0$) thus being created.

Perturbation Using the Gradual Deformation Method

Figure 3:
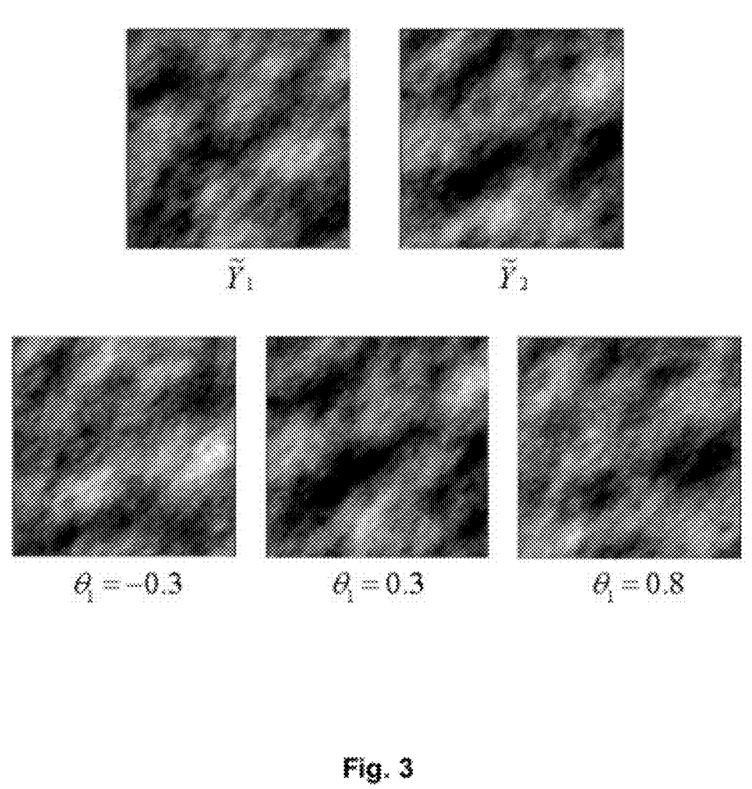
FIG. 3 illustrates an application of the method of the invention for a perturbation obtained by gradual deformation.

In the case of gradual deformation, the parameters are the P=M−1 gradual deformation parameters used for combining the M models of the base set according to formulation $$Y_k^0 = \prod_{j=1}^{M-1} \tilde{Y}_1 \cos(\pi\theta_{k,j}) + \sum_{j=i+1}^{M-1} \tilde{Y}_{i+1} \sin(\pi\theta_{k,j}) \prod_{j=i+1}^{M-1} \cos(\pi\theta_{k,j}),$$

$$k = 1 \ldots N.$$

The initial values of the gradual deformation parameters are generated randomly. FIG. 3 shows three realizations obtained with $\theta_1=-0.3$, $\theta_1=0.3$ and $\theta_1=0.8$, and from a base set containing two models $\tilde{Y}_1$ and $\tilde{Y}_2$.

Perturbation Using the Pilot Point Method

In the case of pilot points, the base set contains M=N models. The parameters are the values imposed by kriging on these models at the location of P pilot points (or grid cells):

Goovaerts, P., 1997, Geostatistics for Natural Resources Valuation, Oxford University Press, New York, USA.

The pilot points must be spaced out by at least one correlation length. The initial values of the parameters can be extracted from the base models. They can also be generated randomly.

Figure 4:
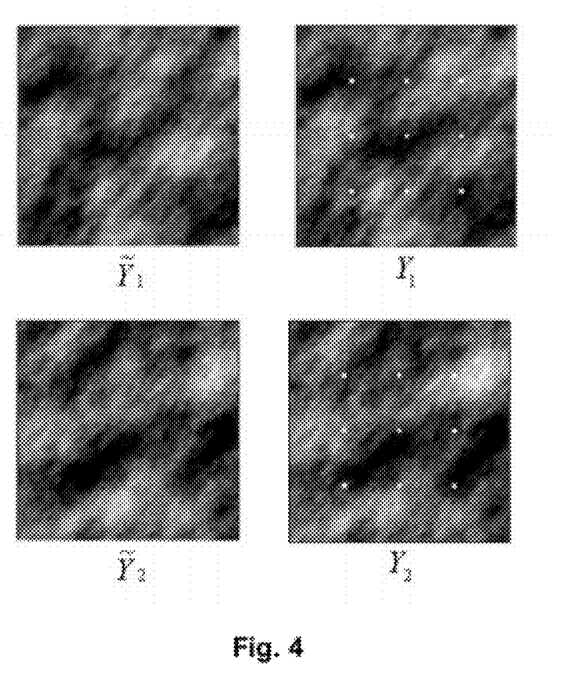
FIG. 4 illustrates an application of the method of the invention in the case of a perturbation obtained by the pilot point technique.

FIG. 4 shows two realizations $Y_1$ and $Y_2$ before and after perturbation at 9 pilot points (white points in the figures on the right) whose location is shown by white points.

2—Dynamic Data Acquisition (DD$_1$, ... DD$_D$)

At this stage, the dynamic data have not been considered for constructing the reservoir models. Dynamic data are thus acquired during the reservoir development. These data are production data, well test data, breakthrough time data, 4D seismic data whose specific feature is to vary over time as a function of the fluid flows in the reservoir.

This stage is carried out by means of measuring tools such as flow meters or of seismic campaigns.

Integration of the dynamic data in the reservoir models involves a series of data assimilation stages. The models are successively adjusted to reduce the difference between the newly connected dynamic data in the field and the corresponding responses simulated for the models are considered. This series of stages is the basis of history matching.

3—History Matching (CAL$_1$, ... CAL$_D$)

Figure 2:
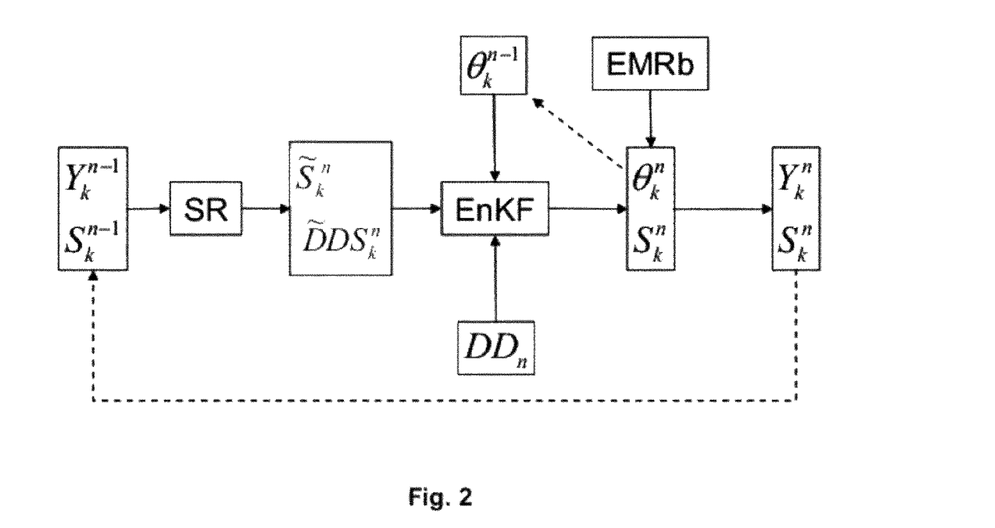
FIG. 2 illustrates the history matching stage according to the method of the invention.

History matching is achieved (FIG. 2) by the following stages:

selecting a perturbation method with P perturbation parameters $\theta_k^{n-1}$;

modifying the parameters by applying an Ensemble Kalman Filter method (EnKF); and modifying the models by applying the perturbation method with the modified parameters.

Matching is thus based on a new application of the Ensemble Kalman Filter (EnKF).

The Ensemble Kalman Filter method is a sequential data assimilation method. It is a variant of the Kalman filter allowing constraining in real time the dynamic state of a system to dynamic observations. The Kalman filter applies to linear dynamic systems:

Kalman, R., 1960, A New Approach to Linear Filtering and Prediction Problems, Transactions of ASME, Journal of Basic Engineering, 82, 35-45.

The Ensemble Kalman Filter extends the method to the case of non-linear dynamic systems such as fluid flows in porous media which is a phenomenon governing the evolution of a reservoir over time:

Evensen, G., 2007, Data Assimilation: The Ensemble Kalman Filter, Berlin, Germany, Springer.

The Ensemble Kalman Filter method constrains in real time a set of reservoir models to each new dynamic measurement acquired in the field, without reconsidering the data which was acquired before. It is composed of two stages, applied between two successive data acquisitions at times $t_i$ and $t_{i+1}$: the background (or prediction) and the correction (or analysis).

When it is desired to assimilate new dynamic data with the EnKF method, a given time in the reservoir development is considered and it is assumed that a set of models of the reservoir is known at this time. This time can correspond to the state of the reservoir before production or it can result from a previous assimilation. A reservoir simulation is then performed on each model of the time considered up to the time of acquisition of the new data. A filter is then applied in order to adjust the reservoir models and to compel them to meet the measured data. This filter is applied to all of the reservoir models but it does not guarantee that the perturbed models verify the spatial variability model deduced from the static observations.

According to the invention, upon each new dynamic data acquisition (DD$_n$) at time $t_n$, n>1, a set of reservoir models $Y_k^{n-1}$, k=1 ... N (porosity, permeability) is present and the corresponding dynamic state $S_k^{n-1}$, k=1 ... N (pressure, saturation) at a given time $t_{n-1}$ before $t_n$. This dynamic state can be the state of the reservoir before production (EI) or it can result from an assimilation (DD$_{n-1}$).

Then, for each reservoir model $Y_k^{n-1}$, a reservoir simulation (SR) is carried out using a software referred to as reservoir simulator, between the times $t_{n-1}$ and $t_n$ from the dynamic state $S_k^{n-1}$. We thus obtain the dynamic state of the reservoir $\tilde{S}_k^n$ at time $t_n$ and the corresponding simulated dynamic responses $\tilde{DDS}_k^n$.

Then, in order to calibrate the models to the dynamic data measured at time $t_n$, the perturbation parameters are modified by applying an Ensemble Kalman Filter method (EnKF) to a set of states comprising the perturbation parameters and the simulated dynamic data: $\theta_k^{n-1}$, $\tilde{DDS}_k^n$. According to an embodiment, the Ensemble Kalman Filter (EnKF) is applied to the following set of states: $\theta_k^{n-1}$, $\tilde{S}_k^n$, $\tilde{DDS}_k^n$. This amounts to minimizing the error between the measured dynamic data DD$_n$ and the corresponding simulated responses $\tilde{DDS}_k^n$.

A set of perturbations $(\gamma_k^n)_{k=1 \ldots N}$ is therefore applied to the measured data DD$_n$, thus creating a set of noise-affected data $DDb_k^n = DD_n + \gamma_k^n$.

It is written:

$A = (\theta_k^{n-1}, \tilde{S}_k^n, \tilde{DDS}_k^n)_{k=1 \ldots N}$ which is the vector comprising the set of states at time $t_n$ $DDb = (DDb_k^n)_{k=1 \ldots N}$ which is the set of noise-affected measurements the corrected models $A_{corrigé} = (\theta_k^n, S_k^n, DDS_k^n)_{k=1 \ldots N}$ which are given by:

$$A_{corrigé} = A + CH^T(HCH^T + C_{erreur})^{-1}(DDb - HA)$$

where C represents the covariance matrix of the set of states, $C_{erreur}$ represents the covariance matrix of the error on the measurements and H representing the measurement operator allowing extraction of the simulated data from each model:

$$C = \frac{A'(A')^T}{N-1}, A' = A - A \times 1_N, 1_N = \begin{pmatrix} 1/N & \cdots & 1/N \\ \vdots & \ddots & \vdots \\ 1/N & \cdots & 1/N \end{pmatrix} \in R^{N \times N}$$

$$C_{erreur} = \frac{\gamma \gamma^T}{N-1}$$

$$HA = (\tilde{D}DS_k^n)_{k=1 \ldots N}$$

The Ensemble Kalman Filter method thus provides a set of models constrained to the dynamic data.

Thus a new set of parameters $\theta_k^n$ and of dynamic states $S_k^n$ at time $t_n$ is obtained. The new set of reservoir models $Y_k^n$ is deduced by perturbing the models of the base set with the new sets of parameters $\theta_k^n$ (EMR$_n$).

Applying the filter to the perturbation parameters provides calibration and guarantees that the perturbed models verify the spatial variability model deduced from the static observations (random function).

4—Reservoir Development According to an Adjusted Development Scheme (EX-SE)

From such a set of reservoir models calibrated with the dynamic data, define or adjust a development scheme occurs. In fact, since reservoir models are representative of the structure of the reservoir and of the behavior thereof, engineers use them, for example, in order to determine which zones are the most likely to contain hydrocarbons, the zones in which it may be interesting/necessary to drill an injection or a production well in order to enhance hydrocarbon recovery, the type of tools to use, the properties of the fluids used and recovered, etc. These interpretations of reservoir models in terms of "technical development parameters" are well known.

The reservoir is then developed according to this development scheme which is adjusted to the reservoir models resulting from history matching.

Variants

Fades Perturbation Using the Gradual Deformation Method

It is possible to apply the method described above for gradual deformations, not petrophysical realizations, but realizations of a reduced centered Gaussian random function. This notably allows applying the truncated Gaussian and pluriGaussian methods in order to deduce facies realizations therefrom:

Goovaerts, P., 1997, Geostatistics for Natural Resources Evaluation, Oxford Press, New York, 483 p.

In this case, the base set thus contains a set of realizations of a reduced centered Gaussian random function. After applying the parametrization technique to this set, a truncation stage is necessary to deduce the facies realizations.

Gaussian White Noise Perturbation Using the Gradual Deformation Method

It is possible to apply the method described above for gradual deformations, not for petrophysical realizations but for Gaussian white noises. This notably allows to perform local gradual deformations. In this case, the base set thus contains a set of Gaussian white noises. After applying the parametrization technique to this set, a geostatistical simulation algorithm such as the FFT-MA method can be applied to generate the realizations of the petrophysical properties.

Le Ravalec, M., Noetinger B., and Hu L.-Y., 2000, The FFT Moving Averager (FFT-MA Generator: An Efficient Numerical Method for Generating and Conditioning Gaussian Simulations, Mathematical Geology, 32(6), 701-723.

Perturbations Using the Local Gradual Deformation Method

It is possible to apply the method described above by considering local gradual deformations, and by considering Gaussian white noises in the base set. In this case, R non-overlapping reservoir regions are defined and M−1 local gradual deformation parameters are generated in each region. The combination of the models of the base set is achieved as above wherein the parameter value that is used depends on the region being considered.

Perturbations Using the Local Gradual Deformation Method

It is possible to apply the method described above by considering local gradual deformations. In this case, R non-overlapping reservoir regions are defined and M−1 local gradual deformation parameters are generated in each region. The combination of the models of the base set is achieved as above with the parameter value that is used depends on the region being considered.

Application Example

To illustrate the method, a synthetic application case is described. The reservoir contains a facies of constant porosity. The distribution of the horizontal permeabilities in the reservoir is unknown. The field contains oil and water. It is produced from 4 producers located in the corners of the reservoir. Water is injected into a well drilled at the center of the reservoir. The injection flow rate is 40 m$^3$/day for 3 months, then 50 m$^3$/day for 5 months, and finally 60 m$^3$/day for 10 months. A 10 m$^3$/day oil production flow rate is imposed on each producer. During these 17 months, pressure data (BHFP), oil flow rate data (QOS) and data regarding the relative amount of water produced (W CUT) are collected in the producer wells.

The goal is then to construct, using the EnKF method combined with the parametrization techniques through gradual deformation and pilot points, a geological model reproducing these data, that is a 3D grid with horizontal permeability values assigned to each cell. The organization of the various stages of the method is illustrated in FIGS. 1 and 2.

Creation of the Base Set

The horizontal permeability is considered as a random variable after logarithmic transformation, of mean 5, of variance 2.5 and of spherical variogram. The correlation lengths are 200 m and 40 m. The FFT-MA algorithm is used to simulate a base set of M permeability logarithm models, by varying the underlying set of random numbers from one model to the next.

Parameter Selection and Initial Set Generation

The two parametrization techniques have been considered. The size of the set of initial models is N=50.

1. Gradual Deformation Perturbation

A base set containing M=2500 models is considered. N=50 sets of M−1 global deformation parameters are then generated.

2. Pilot Point Perturbation

Figure 5:
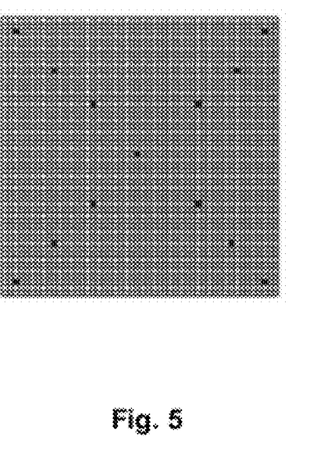
FIG. 5 shows the configuration of the pilot points (in black) used for the application case.

The distribution of the 13 pilot points in the reservoir is given in FIG. 5 (black points in the figure). They are located in the wells and along the main directions of the flow. Here a base set of M=N=50 models is considered.

History Matching

The dynamic data are assimilated at the beginning of each month which results in 17 successive assimilations. Reservoir simulations are then performed on the models obtained after calibration in order to estimate the efficiency of the method in terms of calibration and prediction. The results for one of the producer wells can be seen in FIG. 6 for the gradual deformation method and in FIG. 17 for the pilot point method, considering the models before and after calibration.

Figure 6:
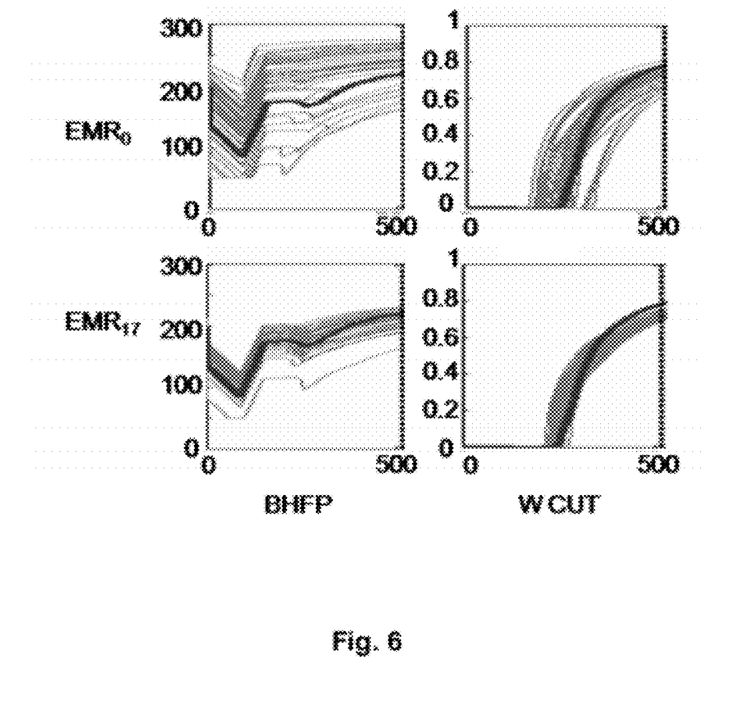
FIG. 6 shows the simulated production data with all the models before (top) and after (bottom) calibration, considering the EnKF method coupled with the gradual deformation technique with the measured data being represented by a widest curve.

FIG. 6 illustrates on the left the bottomhole pressure (BHFP in bar) as a function of time in days (abscissa) and on the right the water cut (W CUT) as a function of time in days (abscissa). The figures at the top illustrate the results obtained for the reservoir models of the initial set ($EMR_0$). These results are shown in grey with the wider black curve corresponding to the reference data. The figures at the bottom illustrate the results obtained for the reservoir models of the final set after 17 calibrations ($EMR_{17}$). These results are shown in grey with the wider black curve corresponding to the reference data.

Figure 7:
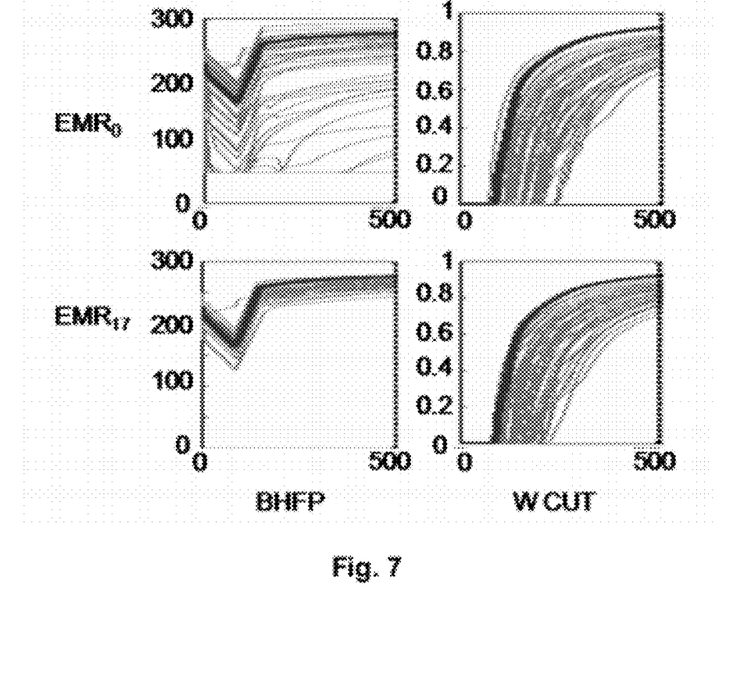
FIG. 7 shows the simulated production data with all the models before (top) and after (bottom) calibration, considering the EnKF method coupled with the pilot point technique with the measured data being represented by the widest curve.

FIG. 7 illustrates the same results as FIG. 6 in the context of the pilot point method.

It can thus be seen that the data simulated with the various sets after calibration are closer to one another than those simulated with the initial set. They are also closer to the measured data.

Figure 8:
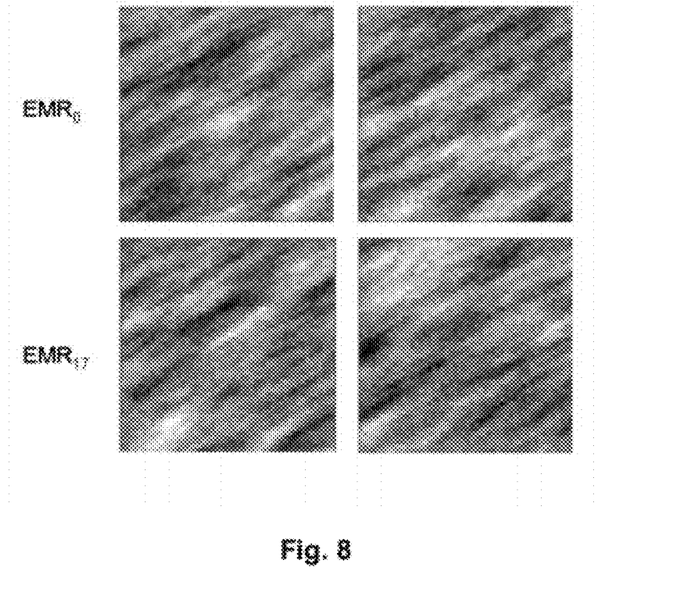
FIG. 8 shows two of the models before (top) and after (bottom) calibration, considering the EnKF method coupled with the gradual deformation technique.
Figure 9:
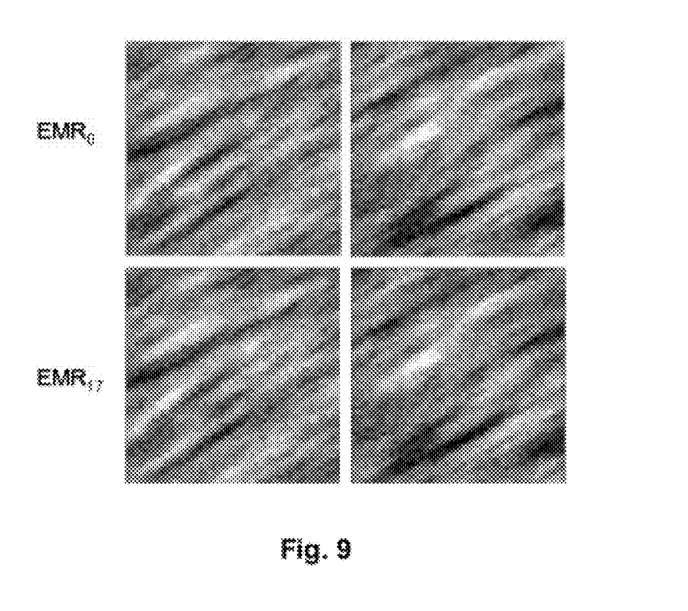
FIG. 9 shows two of the models before (top) and after (bottom) calibration, considering the EnKF method coupled with the pilot point technique.

Reservoir models before ($EMR_0$) and after ($EMR_{17}$) calibration can be seen in FIGS. 8 and 9 respectively for the gradual deformation and the pilot points. The perturbed models are entirely realistic with regard to the characteristics of the underlying random function.

The invention claimed is:

1. A method of developing a petroleum reservoir according to a development scheme defined from a computer implemented representation of the reservoir, the representation comprising a grid associated with maps of properties of the reservoir, each map being a realization of an identical random function defined from static data and obtained by a stochastic simulation, wherein dynamic data are acquired during development of the reservoir, and the maps are modified to minimize a difference between the dynamic data and dynamic data simulated by the representation of the reservoir and a flow simulator, comprising:

selecting a perturbation method utilizing perturbation parameters for perturbing the maps without modifying the coherence of the perturbed maps with the static data;

modifying the parameters by applying a method using a Ensemble Kalman Filter to the perturbation parameters and to the simulated dynamic data;

modifying the maps by using the perturbation method with the modified parameters with the perturbed maps verifying the spatial variability model deduced from the static data;

adjusting the reservoir development scheme by accounting for the modified maps; and developing the reservoir using the modified development scheme.

2. A method as claimed in claim 1, wherein the perturbation method is selected from one of the following methods:
the gradual deformation method,
the pilot point method,
the probability perturbation method, and
the cosimulation perturbation method.

3. A method as claimed in claim 2, wherein the perturbation method is the gradual deformation method and wherein Gaussian white noises from which the property maps of the reservoir are generated are perturbed.

4. A method as claimed in claim 2, wherein the perturbation method is the gradual deformation method, realizations of a reduced centered Gaussian random function are perturbed, and truncated Gaussian and pluriGaussian methods are used to deduce facies realizations.

5. A method as claimed in claim 3, wherein the perturbation method is a local gradual deformation method.

6. A method as claimed in claim 4, wherein the perturbation method is a local gradual deformation method.

* * * * *